United States Patent
Sharma et al.

(10) Patent No.: US 10,369,989 B2
(45) Date of Patent: Aug. 6, 2019

(54) PARKING ASSISTANCE SYSTEM AND METHOD FOR CONTROLLING THE SAME

(71) Applicant: MANDO CORPORATION, Gyeonggi-do (KR)

(72) Inventors: Saurabh Sharma, Gurgaon (IN); Alok Miglani, Gurgaon (IN); Arijit Mandal, Gurgaon (IN); Rajeev Ranjan, Gurgaon (IN)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/788,668

(22) Filed: Oct. 19, 2017

(65) Prior Publication Data
US 2018/0105166 A1  Apr. 19, 2018

(30) Foreign Application Priority Data
Oct. 19, 2016 (KR) .................. 10-2016-0135765

(51) Int. Cl.
*B60W 30/06* (2006.01)
*B60Q 1/48* (2006.01)
(Continued)

(52) U.S. Cl.
CPC ............. *B60W 30/06* (2013.01); *B62D 15/02* (2013.01); *G05D 1/0212* (2013.01); *G05D 1/0238* (2013.01); *G05D 1/0246* (2013.01)

(58) Field of Classification Search
CPC ........... B60W 30/06; B60Q 1/48; B60Q 1/32; G08G 1/16; B60R 1/00; G01C 21/26; G05D 1/00; B62D 15/0275
See application file for complete search history.

(56) References Cited

U.S. PATENT DOCUMENTS 9,031,731 B2   5/2015 Choi et al.
10,191,487 B2 * 1/2019 Hong ................. B64C 13/20
(Continued)

FOREIGN PATENT DOCUMENTS

EP   2 233 359         9/2013
EP   2707266 A4 * 12/2015 ......... B62D 15/0275
(Continued)

OTHER PUBLICATIONS

Office Action dated May 16, 2018 for Korean Patent Application No. 10-2016-0135765 and its English machine translation by Global Dossier.
(Continued)

*Primary Examiner* — Yuri Kan
(74) *Attorney, Agent, or Firm* — Ladas & Parry, LLP

(57) ABSTRACT

Disclosed herein are a parking assistance system (PAS) and a method for controlling the same. The PAS according to the present disclosure includes a state sensing unit that senses a state of a vehicle including speed information and gear information of the vehicle, an obstacle sensing unit that photographs a forward, backward, or lateral side image of the vehicle and senses an obstacle present on a front, rear, or lateral side of the vehicle, and a control unit that calculates a parking trajectory based on information about the sensed state and obstacle of the vehicle, and displays the photographed forward or backward image including the calculated parking trajectory based on the sensed gear information of the vehicle, when a speed of the vehicle is less than a preset threshold value.

9 Claims, 5 Drawing Sheets

(51) Int. Cl.
  *B60R 1/00* (2006.01)
  *G05D 1/02* (2006.01)
  *B62D 15/02* (2006.01)

(56) References Cited

U.S. PATENT DOCUMENTS

| | | | | |
|---|---|---|---|---|
| 2011/0095910 | A1* | 4/2011 | Takano | B60R 1/00 |
| | | | | 340/932.2 |
| 2013/0162825 | A1 | 6/2013 | Yoon et al. | |
| 2014/0247352 | A1* | 9/2014 | Rathi | B60R 1/00 |
| | | | | 348/148 |
| 2015/0179075 | A1* | 6/2015 | Lee | G08G 1/165 |
| | | | | 340/932.2 |
| 2016/0137126 | A1* | 5/2016 | Fursich | B60R 1/00 |
| | | | | 348/38 |
| 2017/0003134 | A1* | 1/2017 | Kim | B60R 1/00 |
| 2017/0210282 | A1* | 7/2017 | Rodriguez Barros | G03B 21/00 |

FOREIGN PATENT DOCUMENTS

| | | |
|---|---|---|
| JP | 2011-2884 | 1/2011 |
| JP | 2014-43140 | 3/2014 |
| JP | 2015-74258 | 4/2015 |
| JP | 2016-2957 | 1/2016 |
| KR | 10-2013-0106005 | 9/2013 |

OTHER PUBLICATIONS

Office Action dated Nov. 19, 2018 for Korean Patent Application No. 10-2016-0135765 and its English machine translation by Global Dossier.

* cited by examiner

PARKING ASSISTANCE SYSTEM AND METHOD FOR CONTROLLING THE SAME

CROSS-REFERENCE TO RELATED APPLICATION

This application claims the benefit of Korean Patent Application No. 2016-0135765, filed on Sep. 19, 2016 in the Korean Intellectual Property Office, the disclosure of which is incorporated herein by reference.

BACKGROUND

1. Field

Embodiments of the present disclosure relate to a parking assistance system (PAS) and a method for controlling the same, and more particularly, to a parking assistance system that generates a parking trajectory in accordance with a distance from a surrounding obstacle and a parking space and a method for controlling the same.

2. Description of the Related Art

In the past, a driver of a vehicle has moved the vehicle using a side mirror or a room mirror mounted on the vehicle while visually checking rear or side obstacles at the time of parking.

However, there is a blind spot that the driver cannot recognize in a rear corner portion of the vehicle, and when the driver does not know exactly the length or width of the vehicle although recognizing an obstacle, a distance between the vehicle and the obstacle cannot be recognized, so that the vehicle is brought into contact with the obstacle to cause a fender bender.

Recently, a parking assistance system (PAS) has been introduced to solve the above-mentioned problems by mounting a sensor on the rear and front of the vehicle to help a driver to recognize a distance from an obstacle by an alarm sound.

In addition, an around view monitor (AVM) system has been introduced, which captures a parking space in a surrounding area of a current vehicle, particularly, a space that is difficult for a driver to visually check at the time of parking and displays the captured spaces to the driver. Such an AVM system can also display a parking trajectory for the current vehicle to be located in the parking space by grasping the parking space at a current vehicle position.

However, when the parking trajectory is displayed, a case where obstacles come close to the vehicle nearby is not displayed, so that the driver does not grasp this.

In addition, recently, a PAS has been introduced, which recognizes a space in which a vehicle is to be parked and automatically generates a parking path to automatically control a steering device, an acceleration device, and a braking device so that a driver can park the vehicle automatically without manipulating the steering device, the acceleration device, and the braking device.

However, such a PAS operates only when a sufficient space for parking is secured and does not operate in other low-speed driving situations, so that the PAS is not enough to prevent the driver's vehicle from being brought into contact with surrounding objects in a densely populated area where the parking space is not sufficient.

PRIOR ART DOCUMENT

Patent Literature

United States Patent Publication No. US 2013/0162825

SUMMARY

Therefore, it is an aspect of the present disclosure to provide a parking assistance system (PAS) and a method for controlling the same, which prevent a fender bender that may occur due to not displaying a surrounding obstacle that a driver cannot recognize when a parking trajectory is displayed to the driver using an around view monitor (AVM) system.

It is another aspect of the present disclosure to provide a PAS and a method for controlling the same, which generate a trajectory of a vehicle even when a parking space is not secured, thereby preventing a fender bender with a surrounding vehicle.

It is still another aspect of the present disclosure to provide a PAS and a method for controlling the same, which generate and display a trajectory of a vehicle in a low-speed condition, thereby preventing a fender bender with a surrounding vehicle.

Additional aspects of the disclosure will be set forth in part in the description which follows and, in part, will be obvious from the description, or may be learned by practice of the disclosure.

In accordance with one aspect of the present disclosure, a PAS includes: a state sensing unit that senses a state of a vehicle including speed information and gear information of the vehicle; an obstacle sensing unit that photographs a forward, backward, or lateral side image of the vehicle and senses an obstacle present on a front, rear, or lateral side of the vehicle; and a control unit that calculates a parking trajectory based on information about the sensed state and obstacle of the vehicle, and displays the photographed forward or backward image including the calculated parking trajectory based on the sensed gear information of the vehicle, when a speed of the vehicle is less than a preset threshold value.

Here, the control unit may display the forward image including the calculated parking trajectory when a gear of the vehicle is a forward gear, and display the backward image including the calculated parking trajectory when the gear of the vehicle is a reverse gear.

Also, the control unit may drive at least one of a steering device, an acceleration device, and a braking device so that the vehicle is parked along the calculated parking trajectory.

Also, when the calculated parking trajectory is close to a surrounding obstacle of the vehicle, the control unit may give a warning to a driver.

Also, the obstacle sensing unit may include at least one camera sensor for photographing the forward, backward, or lateral side image of the vehicle and at least one ultrasonic sensor for sensing the obstacle present on the front, rear, or lateral side of the vehicle.

In accordance with one aspect of the present disclosure, a method for controlling a PAS includes: sensing a state of a vehicle including speed information and gear information of the vehicle; photographing a forward, backward, or lateral side image of the vehicle; sensing an obstacle present on a front, rear, or lateral side of the vehicle; calculating a parking trajectory based on information about the sensed state and obstacle of the vehicle; and displaying the photographed forward or backward image including the calculated parking trajectory based on the sensed gear information of the vehicle, when a speed of the vehicle is less than a preset threshold value.

Here, the displaying of the photographed forward or backward image may include displaying the forward image including the calculated parking trajectory when a gear of the vehicle is a forward gear, and displaying the backward image including the calculated parking trajectory when the gear of the vehicle is a reverse gear.

Also, the method for controlling a PAS may further include driving at least one of a steering device, an acceleration device, and a braking device so that the vehicle is parked along the calculated parking trajectory.

Also, when the calculated parking trajectory is close to a surrounding obstacle of the vehicle, the method for controlling a PAS may further include giving a warning to a driver.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
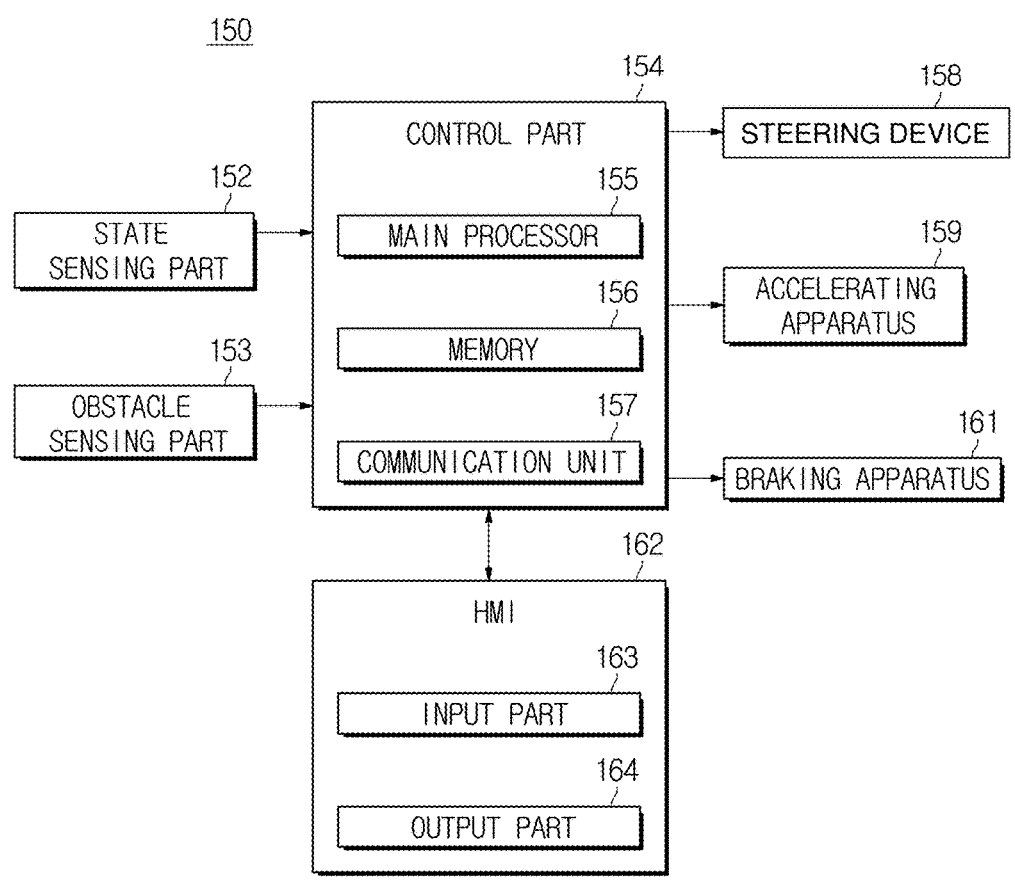
FIG. 1 is a block diagram illustrating a parking assistance system (PAS) according to an embodiment.

Hereinafter, embodiments of the present disclosure will be described with reference to the accompanying drawings. The following examples are provided to convey the spirit of the disclosure to those skilled in the art. The present disclosure is not limited to the embodiments disclosed herein and may be embodied in other forms. In the drawings, some of the portion irrelevant to the description will be omitted and not shown in order to clearly describe the present, and disclosed components may be slightly exaggerated to facilitate understanding.

FIG. 1 is a block diagram illustrating a parking assistance system (PAS) according to an embodiment.

A vehicle 1 may include various electronic devices 100.

For example, the vehicle 1 may include an engine management system (EMS), a brake control device (brake-by-wire), a pedal device, an audio/video/navigation (AVN) device, a PAS, a transmission management system (TMS), a steering control device (steering-by-wire), a communication device, an input/output control system, and other vehicle sensors. However, the vehicle 1 is not limited thereto, and more various electronic devices may be provided.

Accordingly, a PAS 150 according to the present disclosure installed in the vehicle 1 is also one system of various electronic devices of the vehicle, and may be interconnected with other electronic devices of the vehicle 1 through a vehicle communication network (NT).

At this time, the vehicle communication network (NT) may adopt communication protocols such as media oriented systems transport (MOST) having a communication speed of up to 24.5 mega-bits per second (Mbps), FlexRay having a communication speed of up to 10 Mbps, a controller area network (CAN) having a communication speed of 125 kilo-bits per second (kbps) to 1 Mbps, and a local interconnect network (LIN) having a communication speed of 20 kbps, and the like.

By way of example, the AVN device included in the vehicle is a device that outputs music or video according to a control command of a driver. Specifically, the AVN device may reproduce music or a moving picture or guide a route to a destination according to the control command of the driver. Thus, a display of the AVN device may adopt a touch-sensitive display (e.g., a touch screen) capable of receiving a touch input of the driver.

In addition, by way of example, the input/output control system included in the vehicle receives the control command of the driver via a button and displays information corresponding to the control command of the driver. The input/output control system may include a cluster display that is provided on a dashboard to display an image and a head up display (HUD) that projects an image on a windshield, and thereby may display the information corresponding to the control command of the driver.

As the cluster display is provided on the dashboard to display the image, the operation of the PAS 150 according to the present disclosure can be displayed to the driver.

For example, a current driving speed and a driving direction of the driver may be displayed so that the driver can check a state of the vehicle in real time.

A cluster display 191 may adopt a liquid crystal display (LCD) panel or an organic light emitting diode (OLED) panel.

By way of another example, the HUD may project an image onto the windscreen and thereby may display operation information of the vehicle 1, road information or a driving route, and the operation of the PAS 150 according to the present disclosure to the driver.

The other vehicle sensors may include a camera sensor, an ultrasonic sensor, an acceleration sensor, a yaw rate sensor, a steering angle sensor, a speed sensor, and the like, which are included in the vehicle 1 to obtain driving information of the vehicle.

The camera sensor captures a surrounding image, and may capture an external image of the vehicle and may generate photographing information about the captured image.

Specifically, the camera sensor usually uses more than one channel camera, and a complementary metal oxide semiconductor (CMOS) can be usually used as an image sensor therefor. A CMOS image sensor is a semiconductor device that converts an exposed image into an electrical form and transmits the result.

However, the camera sensor is not limited thereto, and may be implemented as a change coupled device (CCD) image sensor. In this manner, a camera sensor 193 can be installed at a plurality of positions of the vehicle 1 to acquire forward, backward, and side images of the vehicle.

Figure 2:
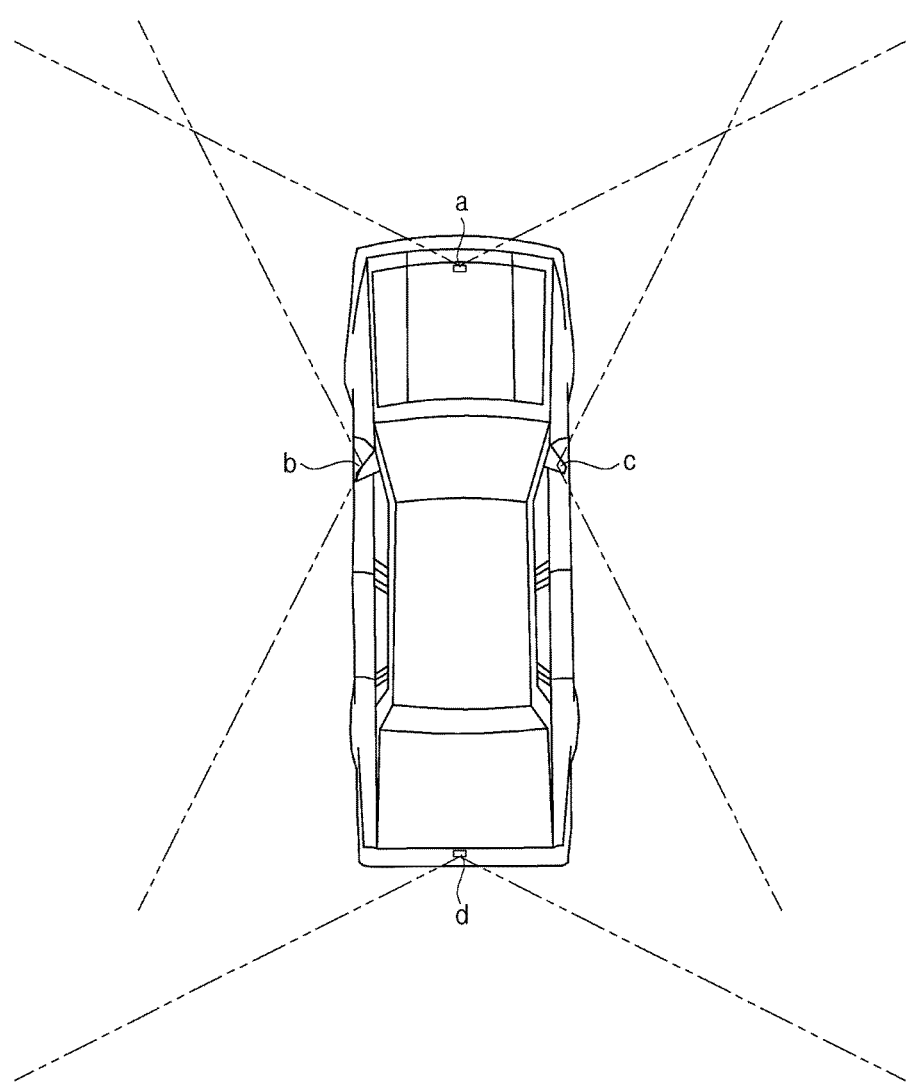
FIG. 2 is a schematic diagram illustrating surrounding photographing using a camera installed in a vehicle according to an embodiment.

Specifically, FIG. 2 is a schematic diagram illustrating surrounding photographing using a camera installed in a vehicle according to an embodiment.

A camera sensor may include a camera sensor a located at the forefront center of a bonnet covering an engine room of a front portion of the vehicle to obtain an image of the front of the vehicle, camera sensors b and c located in the side mirrors of the vehicle to obtain images of both lateral sides and the rear of the vehicle, and a camera sensor d located at the most posterior center of a trunk of a rear portion of the vehicle to obtain an image of the rear of the vehicle.

However, according to an embodiment of the present disclosure, the camera sensor 193 (a to d) is illustrated as including the four cameras a to d, but the camera sensor 193 may include only the cameras capable of obtaining the images of the front and the rear of the vehicle. That is, the number of the cameras is not limited.

Accordingly, an around view monitor (AVM) that captures a parking space in a surrounding area of a current vehicle, particularly, a space that is difficult for a driver to visually check at the time of parking using a plurality of camera sensors a to d, and displays the captured images to the driver may be operated.

That is, the images captured by the camera sensor 193 may be transmitted to a control module (not illustrated), and the control module may integrate the captured images to generate surrounding images.

Specifically, the camera sensor 193 may transmit corrected front camera and rear camera images to the PAS 150 through an algorithm for correcting distorted images based on the captured images.

In addition, after being subjected to the algorithm for correcting the distorted images, the camera sensor 193 may generate a top virtual view image through an algorithm for synthesizing (blending) images obtained by the four camera sensors a to d, and may transmit the generated top virtual view image to the PAS 150.

That is, through the algorithm for synthesizing (blending) the four camera sensors, the images are synthesized before a top view including a trajectory is generated in the PAS 150 to ensure the ease of generation of the trajectory.

Next, an ultrasonic sensor 194 may be installed on the front, the side, or the rear of the vehicle 1 to transmit an ultrasonic signal to a target object located in the vicinity of the vehicle. That is, the ultrasonic sensor 194 is installed to be rotatable in the horizontal direction to transmit an ultrasonic signal while maintaining a constant rotation angle. Next, the ultrasonic sensor 194 measures a space size existing on the lateral side or the rear of the vehicle 1, that is, a depth D and a width L of the space using a time taken for the ultrasonic signal reflected from the target object to return, and detects an obstacle located in the vicinity of the vehicle 1.

A steering angle sensor 198 measures a steering angle. The steering angle sensor 198 may be mounted on a lower end of a steering wheel (not illustrated) to detect a steering speed, a steering direction, and a steering angle of the steering wheel. Accordingly, the steering angle sensor 198 may detect the steering speed, the steering direction, and the steering angle of the steering wheel and may provide corresponding information to the PAS 150 according to the present disclosure.

A speed sensor 199 may be installed inside a vehicle wheel to detect a rotational speed of the vehicle wheel and may transmit a value of the measured rotational speed of the vehicle wheel to the PAS 150 via the vehicle communication network NT.

Finally, the communication device serving as one of the electronic devices included in the vehicle may include a wireless communication unit that performs wireless communication with a terminal used by a driver or performs continuous communication with a plurality of vehicles outside the vehicle, an internal communication unit that is connected to the vehicle communication network (NT) for performing communication between the various electronic devices in the vehicle, and a communication control unit 182 that controls the wireless communication unit and the internal communication unit.

Accordingly, the communication device may transmit various sensor values necessary for the operation of the PAS 150 according to the present disclosure and may transmit a control signal according to the operation of the PAS 150 to the various electronic devices of the vehicle.

Next, the PAS 150 according to the present disclosure includes a state sensing unit 152 that senses the state of the vehicle based on information received through the vehicle communication network NT, an obstacle sensing unit 153 that senses obstacles in the vicinity of the vehicle, a control unit 154 that performs a parking assistance control based on information obtained through the state sensing unit 152 and the obstacle sensing unit 153, a human machine interface (HMI) 162 that displays a parking trajectory and an image calculated by the control unit 154, a steering device 158 that performs parking assistance, an acceleration device 159, and a braking device 161. The PAS 150 according to the present disclosure will be described in detail with reference to FIG. 1. The state sensing unit 152 acquires speed information, gear information, steering angle information of the vehicle 1, and the like based on a sensor value received from the vehicle communication network NT. Thus, dynamic information of the vehicle 1 necessary for parking assistance can be confirmed on the PAS 150 according to the present disclosure.

Next, the obstacle sensing unit 153 acquires image information received from the camera sensor 193 and surrounding obstacle information sensed by the ultrasonic sensor 194, from the vehicle communication network NT. Thus, space information in the vicinity of the vehicle 1, which is necessary for parking assistance, can be confirmed on the PAS 150 according to the present disclosure.

In particular, the obstacle sensing unit 153 may acquire corrected front camera and rear camera images through an algorithm for correcting distorted images based on the image information received from the camera sensors 193 (a to d).

In addition, after being subjected to the algorithm for correcting the distorted images, the obstacle sensing unit 153 may acquire a top virtual view image using the camera sensor 193 through an algorithm for synthesizing (blending) images obtained by the four camera sensors a to d.

The control unit 154 collectively controls the PAS 150 according to the present disclosure.

Specifically, the control unit 154 includes a main processor 155 that controls the PAS 150 of the vehicle based on the dynamic information of the vehicle and the surrounding obstacle information respectively obtained from the state sensing unit 152 and the obstacle sensing unit 153, a memory 156 that stores various pieces of data, and a communication unit 157 that transmits a parking assistance control signal calculated by the main processor 155 to the steering device 158, the acceleration device 159, the braking device 161, and the HMI 162 for displaying a control signal to a driver.

In particular, the main processor 155 generates a parking trajectory to be displayed to the driver by the PAS 150 based on the speed information, the gear information, and the steering angle information of the vehicle 1 which are received from the state sensing unit 152. That is, the main processor 155 may calculate the parking trajectory based on the corrected front camera and rear camera images obtained by the obstacle sensing unit 153 and the top view.

By way of example, the main processor 155 may collectively acquire the steering angle information, the gear information, and the speed information of the vehicle, and front or rear ultrasonic sensor information to generate the parking trajectory of the vehicle. However, the generation of the trajectory may be terminated when an obstacle located in the vicinity of the vehicle is detected through the front or rear ultrasonic sensor.

In addition, by way of example, the main processor 155 may generate a vehicle trajectory based on Ackermann steering equation. That is, Ackermann steering equation is a formula for calculating the turning radius of curvature of each wheel by generating trajectories of the inner wheel and the outer wheel. Thus, the main processor 155 may generate a top view trajectory, or may convert the generated top view trajectory into a forward or backward image.

That is, by way of example, when the generated top view trajectory is calculated as a circular turning radius of curvature, the main processor 155 may convert the calculated turning radius of curvature into an elliptical trajectory included in the forward image or an elliptical trajectory included in the backward image so that a user can easily confirm the trajectory.

At this time, the curvature of the parking trajectory generated by the main processor 155 is changed according to the steering angle obtained through the state sensing unit 152. For example, when a driver performs a backward control by himself or herself, the curvature of the parking trajectory can be increased or decreased based on the steering angle input by the steering wheel operation of the driver.

Accordingly, the main processor 155 may calculate the turning radius of curvature of each wheel by reflecting the curvature of the parking trajectory changed on the basis of the steering angle input by the steering wheel operation of the driver, and may convert the calculated turning radius of curvature into the elliptical trajectory included in the forward image or the elliptical trajectory included in the backward image.

In addition, the main processor 155 displays the generated curvature of the parking trajectory through the HMI so that the driver can check the curvature of the parking trajectory for the purpose of parking convenience. At this time, the displayed parking trajectory can be displayed in different colors depending on the distance.

Figure 3:
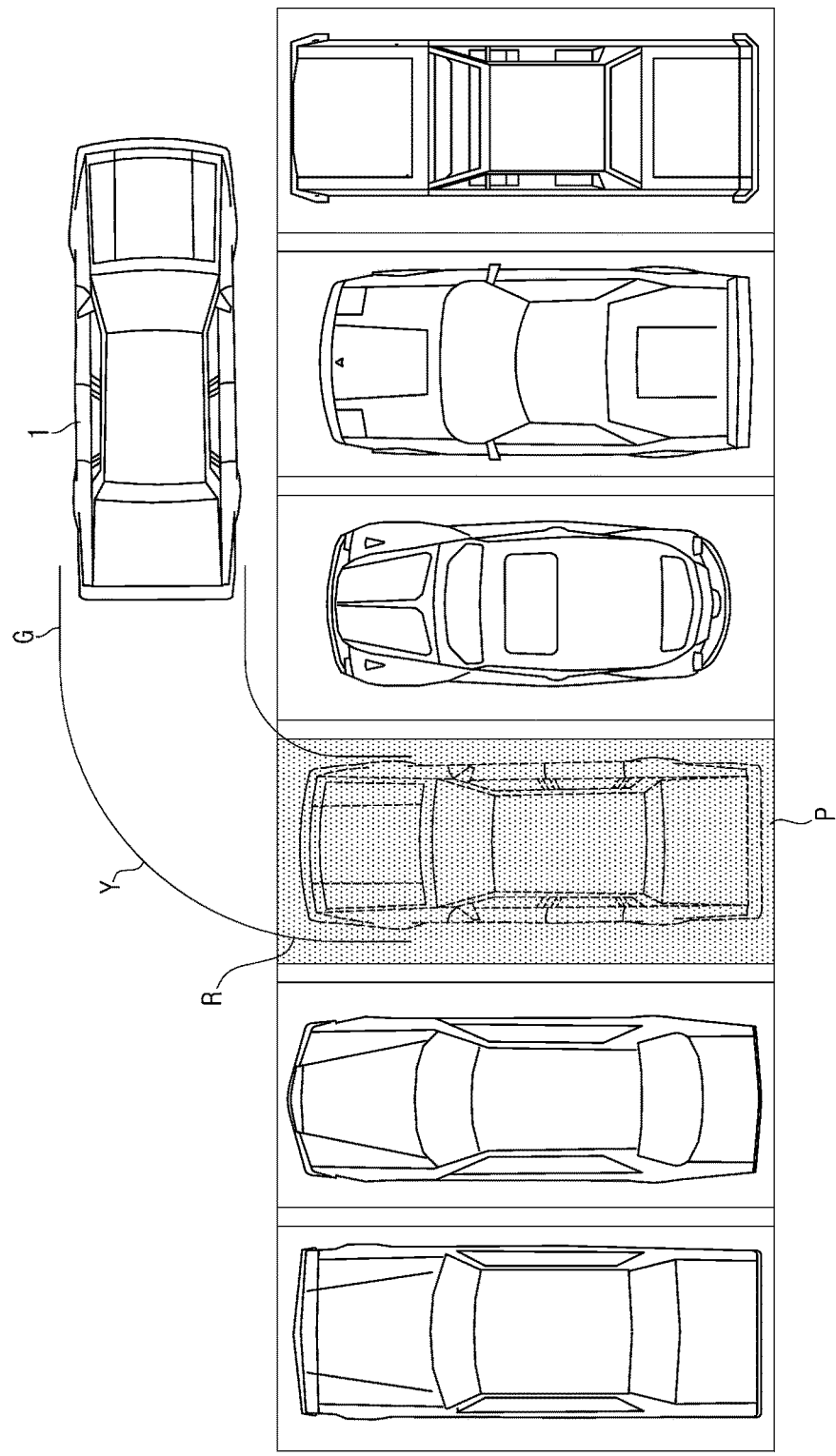
FIG. 3 is a schematic diagram illustrating a parking trajectory generated by a PAS according to an embodiment.

Specifically, FIG. 3 is a schematic diagram illustrating a parking trajectory displayed through the PAS 150 according to an embodiment of the present disclosure.

The vehicle 1 equipped with the PAS 150 according to the present disclosure performs parking by transmitting a parking control signal generated through the control unit 154 to the steering device, the acceleration device, and the braking device so that the vehicle 1 can be parked in a parking space P detected by the obstacle sensing unit 153.

At this time, when the parking is performed through reverse driving, in order to park the vehicle 1 in the parking space P, a parking trajectory is generated and a driver can check the generated parking trajectory through the HMI. Specifically, as illustrated in FIG. 3, when the vehicle 1 is parked in the parking space P, the color of the parking trajectory may be displayed differently depending on a distance from an obstacle.

Thus, the main processor 155 may display the color of the parking trajectory as green (G) when the obstacle is close to the vehicle 1 and a distance between the vehicle 1 and the surrounding obstacle is equal to or greater than a preset first threshold distance (for example, 1 m), may display the color of the parking trajectory as yellow (Y) when the distance between the vehicle 1 and the surrounding obstacle is equal to or greater than a preset second threshold distance (for example, 0.5 m) and less than the first threshold distance, and may display the color of the parking trajectory as red (R) when the distance between the vehicle 1 and the surrounding obstacle is less than the second threshold distance.

That is, when the calculated parking trajectory comes close to the surrounding obstacle, the main processor 155 may warn the driver of this by displaying the different colors.

In addition, the main processor 155 may display a driving trajectory calculated by the PAS 150 according to the present disclosure to the driver, and also perform automatic parking in a corresponding space when the parking space is secured through the obstacle sensing unit 153.

Specifically, when it is determined that an available parking space is secured from the surrounding obstacle information obtained through the obstacle sensing unit 153, the main processor 155 generates the parking trajectory to perform automatic parking in the corresponding available parking space, generates a steering control signal so that the vehicle 1 is parked along the corresponding parking trajectory, and transmits the generated steering control signal to the steering device. Next, the main processor 155 generates an acceleration control signal to enable parking by performing a longitudinal control of the vehicle to thereby transmit the generated acceleration control signal to the acceleration device, or generates a deceleration control signal and transmits a braking control signal to be transmitted to the braking device.

In addition, the main processor 155 of the PAS 150 according to the present disclosure receives speed information of the vehicle 1, generates the driving trajectory of the vehicle to be expected including a forward image in a forward gear depending on a gear position and generates the driving trajectory of the vehicle to be expected including a backward image in a reverse gear in a low-speed condition in which a vehicle speed is smaller than a preset threshold value (first threshold value). In particular, the elliptical trajectory may be generated in the forward image or in the backward image through conversion based on the vehicle trajectory acquired through the top view.

In addition, by way of example, when a driver performs low-speed driving and it is detected that an obstacle comes highly close to the vehicle through the obstacle sensing unit 153 and requires safe driving, the PAS 150 according to the present disclosure generates and displays a driving trajectory according to the steering angle input by the driver to the driver, thereby preventing collision with surrounding obstacles in advance.

That is, the PAS 150 according to the present disclosure displays a vehicle trajectory even in a situation other than when the vehicle is moving backward so that the driver can check the distance from a surrounding obstacle in real time.

Next, the memory 156 included in the control unit 154 stores programs and data of the PAS 150 according to the present disclosure.

Specifically, the memory 156 (not illustrated) may include a volatile memory such as a S-RAM or a D-RAM and a non-volatile memory such as a flash memory, a read only memory (ROM), an erasable programmable read only memory (EPROM), or an electrically erasable Programmable read only memory (EEPROM).

The non-volatile memory may semi-permanently store a control program and control data for controlling the operation of the PAS 150. The volatile memory may read the control program and control data from the non-volatile memory to temporarily store the read control program and control data, and may temporarily store various pieces of sensor information obtained from the communication unit 157 included in the control unit 154 and various control signals output from the main processor 155.

That is, the communication unit transmits the various pieces of sensor information to the main processor 155 through the state sensing unit 152 and the obstacle sensing unit 153, and transmits the control signal generated by the main processor 155 to the steering device, the acceleration device, and braking device to perform parking assistance or transmits image information including the parking trajectory generated by the main processor 155 to the HMI.

The HMI 162 included in the PAS 150 according to the present disclosure includes an input unit 163 that receives a selection command related to the operation of the PAS from the driver, and an output unit 164 that outputs a screen for inducing the selection command related to the operation of the PAS or visually or audibly outputs a distance between the vehicle and an obstacle around the vehicle, the driving trajectory of the vehicle, and the like.

Specifically, the input unit 163 may also receive a selection command related to ON/OFF of the PAS 150 and a selection command related to right angle parking/parallel parking when an automatic parking control is selected.

In addition, the output unit 164 may include a speaker for outputting sound or a display unit for outputting a visual screen. The output unit 164 may visually display the corresponding screen through the HUD included in the various electronic devices 100 illustrated in FIG. 1.

As above, the configuration of the PAS 150 according to the present disclosure has been described.

Hereinafter, a flowchart of a method for controlling the PAS 150 according to an embodiment will be described.

Figure 4:
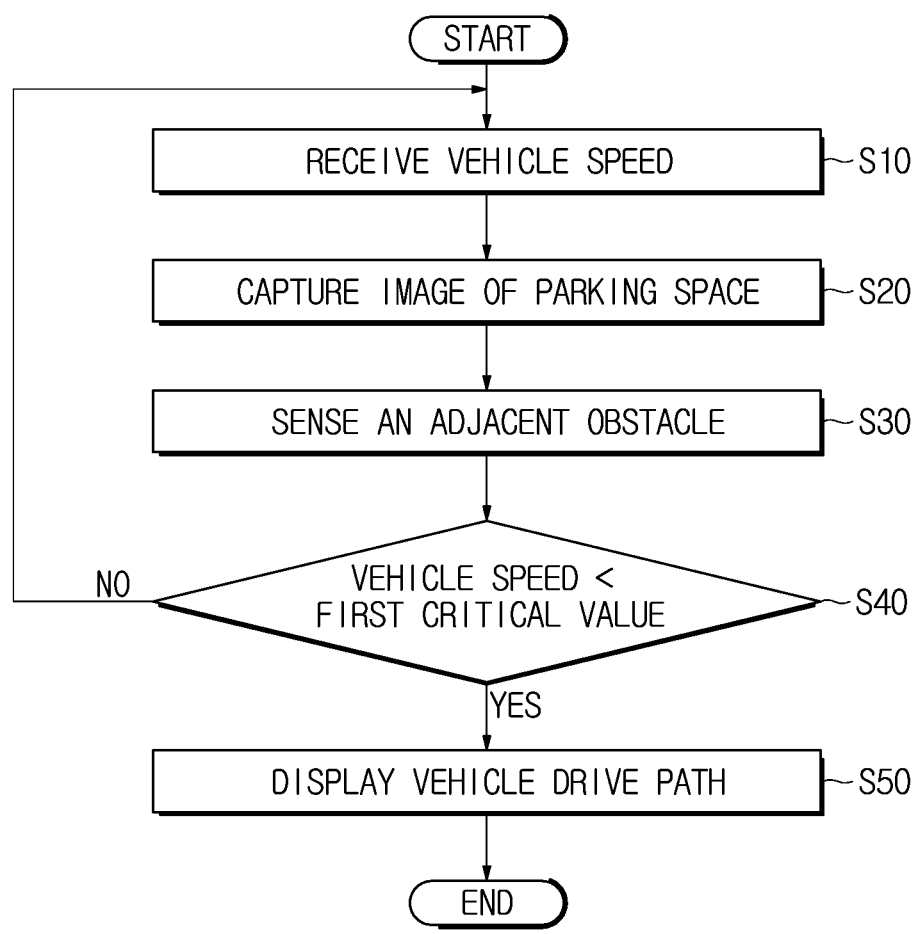
FIG. 4 is a flowchart illustrating a method for controlling a PAS according to an embodiment of the present disclosure.
Figure 5:
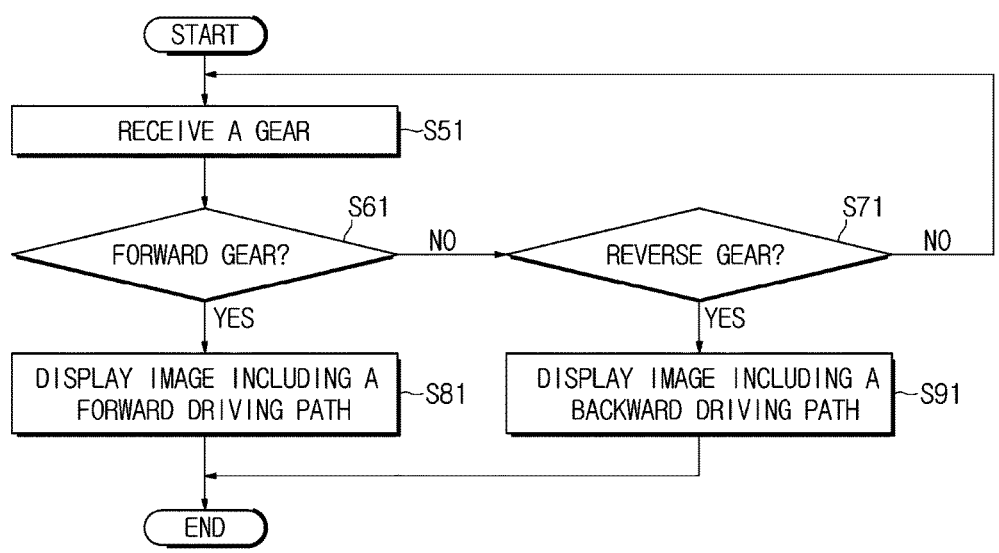
FIG. 5 is a flowchart illustrating a method for controlling a PAS according to another embodiment of the present disclosure.

FIGS. 4 and 5 are flowcharts illustrating the operation of the PAS 150 according to an embodiment of the present disclosure.

Here, the PAS 150 according to the present disclosure operates when an ON input is selectively received from a driver.

First, in operation S10, the PAS 150 receives a speed of the vehicle 1 from the speed sensor. That is, a current vehicle speed is received in real time from vehicle speed information received from the state sensing unit 152 included in the PAS 150.

In addition, in operation S20, the PAS 150 photographs a surrounding space. Specifically, a vehicle surroundings image may be obtained from the plurality of camera sensors 193 included in the vehicle 1.

In addition, in operation S30, the PAS 150 detects a surrounding obstacle. Specifically, distance information and space information from an obstacle located in the vicinity of the vehicle 1 received from the obstacle sensing unit 153 included in the PAS 150 may be obtained. At this time, the obstacle sensing unit 153 may obtain surrounding obstacle information through the ultrasonic sensor 194 included in the vehicle 1.

At this time, in operation S50, when the received vehicle speed is smaller than a preset threshold value (first threshold value) (YES of operation S40), the PAS 150 displays a driving trajectory of the vehicle.

Accordingly, even when the parking space is not secured, in an environment where the distance from the surrounding obstacle is small so that the vehicle is required to be driven at a low speed, the driving trajectory of the vehicle is displayed and provided to a driver, and thus, it is possible to prevent a fender bender with the surrounding obstacle.

Specifically, FIG. 5 is a flowchart illustrating a method for controlling the PAS 150 that operates according to a gear input.

First, in operation S51, the PAS 150 according to the present disclosure receives a gear input of the vehicle 1. Specifically, gear information of the vehicle 1 may be obtained from the state sensing unit 152 included in the PAS 150 according to the present disclosure.

At this time, when receiving a forward gear D (YES of operation S61), the PAS 150 displays a forward image obtained from the camera sensor 193 included in the vehicle 1 and displays an image including a forward driving trajectory in operation S81.

When receiving a reverse gear R (NO of operation S61 and YES of operation S71), the PAS 150 displays a backward image obtained from the camera sensor 193 included in the vehicle 1 and displays an image including a reverse driving trajectory in operation S91.

Accordingly, unlike the conventional PAS 150 that displays the parking trajectory only at the time of reverse traveling operation, the PAS 150 according to the present disclosure displays the parking trajectory even at the time of forward traveling operation, thereby enhancing the convenience of steering operation prediction of the driver.

As described above, according to the embodiments of the present disclosure, it is possible to prevent a fender bender that may occur due to not displaying a surrounding obstacle that a driver cannot recognize when a parking trajectory is displayed to the driver using an AVM system.

In addition, it is possible to generate a trajectory of a vehicle even when a parking space is not secured, thereby preventing a fender bender with a surrounding vehicle.

In addition, it is possible to generate and display a trajectory of a vehicle in a low-speed condition, thereby preventing a fender bender with a surrounding vehicle.

While the present invention has been particularly shown and described with reference to exemplary embodiments thereof, it is clearly understood that the present invention is by way of illustration and example only and is not to be construed as limited to the particular embodiments set forth herein; It will be understood that various modifications may be made without departing from the spirit and scope of the invention.

What is claimed is:

1. A parking assistance system (PAS) comprising:
   a state sensing unit that senses a state of a vehicle including speed information and gear information of the vehicle;
   an obstacle sensing unit that photographs a forward, backward, or lateral side image of the vehicle and senses an obstacle present on a front, rear, or lateral side of the vehicle; and
   a control unit that calculates a parking trajectory based on information about the sensed state and obstacle of the vehicle, and displays the photographed forward or backward image including the calculated parking trajectory based on the sensed gear information of the vehicle, when a speed of the vehicle is less than a preset threshold value, wherein the control unit displays the calculated parking trajectory in different colors depending on a distance from the sensed obstacle.

2. The PAS according to claim 1, wherein the control unit displays the forward image including the calculated parking trajectory when a forward gear is inputted, and displays the backward image including the calculated parking trajectory when a reverse gear is inputted.

3. The PAS according to claim 2, wherein the control unit drives at least one of a steering device, an acceleration device, and a braking device so that the vehicle is parked along the calculated parking trajectory.

4. The PAS according to claim 3, wherein, when the calculated parking trajectory is close to a surrounding obstacle of the vehicle, the control unit gives a warning to a driver.

5. The PAS according to claim 4, wherein the obstacle sensing unit includes at least one camera sensor for photographing the forward, backward, or lateral side image of the vehicle and at least one ultrasonic sensor for sensing the obstacle present on the front, rear, or lateral side of the vehicle.

6. A method for controlling a PAS comprising:
sensing a state of a vehicle including speed information and gear information of the vehicle;
photographing a forward, backward, or lateral side image of the vehicle;
sensing an obstacle present on a front, rear, or lateral side of the vehicle;
calculating a parking trajectory based on information about the sensed state and obstacle of the vehicle; and
displaying the photographed forward or backward image including the calculated parking trajectory based on the sensed gear information of the vehicle, when a speed of the vehicle is less than a preset threshold value, wherein the calculated parking trajectory is displayed in different colors depending on a distance from the sensed obstacle.

7. The method for controlling a PAS according to claim 6, wherein the displaying of the photographed forward or backward image includes displaying the forward image including the calculated parking trajectory when a forward gear is inputted, and displaying the backward image including the calculated parking trajectory when a reverse gear is inputted.

8. The method for controlling a PAS according to claim 7, further comprising:
driving at least one of a steering device, an acceleration device, and a braking device so that the vehicle is parked along the calculated parking trajectory.

9. The method for controlling a PAS according to claim 8, when the calculated parking trajectory is close to a surrounding obstacle of the vehicle, further comprising:
giving a warning to a driver.

* * * * *